United States Patent [19]

Takahashi et al.

[11] Patent Number: 4,497,051
[45] Date of Patent: Jan. 29, 1985

[54] AUTOMATIC RECORD LOADING PLAYER

[75] Inventors: Hideyuki Takahashi; Isami Kenmotsu; Takahiro Okajima, all of Saitama, Japan

[73] Assignee: Pioneer Electronic Corporation, Tokyo, Japan

[21] Appl. No.: 345,846

[22] Filed: Feb. 4, 1982

[30] Foreign Application Priority Data

Feb. 5, 1981 [JP] Japan .................................. 56-16096

[51] Int. Cl.³ ........................ G11B 17/04; G11B 25/04
[52] U.S. Cl. .................................... 369/77.1; 369/270
[58] Field of Search ...................... 369/75.2, 77.1, 78, 369/79, 270

[56] References Cited

U.S. PATENT DOCUMENTS

| | | | |
|---|---|---|---|
| 1,465,909 | 8/1923 | Infante | 369/194 |
| 1,906,620 | 5/1933 | Knight et al. | 369/270 |
| 2,963,296 | 12/1960 | Weise | 369/191 |
| 3,264,003 | 8/1966 | Hevenaz | 369/72 |
| 4,098,510 | 7/1978 | Suzuki et al. | 369/75.1 |
| 4,340,952 | 7/1982 | Ikedo | 369/77.1 |
| 4,347,596 | 8/1982 | Abe et al. | 369/75.2 |

Primary Examiner—Steven L. Stephan
Attorney, Agent, or Firm—Sughrue, Mion, Zinn, Macpeak & Seas

[57] ABSTRACT

An automatic record loading player having a slit through which a record is inserted, the slit is formed in front of player cabinet, a drive mechanism for transferring the inserted record to a centering position, a centering mechanism for achieving the centering operation of the record in abutment with an outer periphery of the record, and a loading mechanism for transferring the centered record onto a turntable while maintaining the record at its center hole.

4 Claims, 38 Drawing Figures

AUTOMATIC RECORD LOADING PLAYER

BACKGROUND OF THE INVENTION

The present invention relates to an automatic record loading player.

There have been proposed two types of automatic record loading player. In one type, the record is transferred onto the turntable after the centering of the record is achieved in the record loading. In the other type, the centering is achieved after the inserted record is transferred above the turntable.

In the former type, when the record is inserted, it is necessary to push the record up to the centering position and it is difficult to insert the record disc having a small diameter in the system in which the centering position is remote from the insertion position. Also, if the centering position is near to the insertion position, a part of centering mechanism is exposed outside disadvantageously.

In the latter type, the centering mechanism must be disposed coaxially with an outside of the turntable. Its construction becomes intricate and enlarged so that the player cabinet must be enlarged in size or the turntable must be miniaturized in size.

Also, in the prior art automatic record loading players, a centering mechanism is required to hold the record, to transfer it to the turntable position and to position it on the turntable. However, the centering mechanism which enables centering records different in diameter is relatively large in size and becomes intricate in construction without operational reliability.

Also, the prior art automatic record loading player suffers from disadvantage in its drive guide means for the center spindle assembly.

There have been provided automatic record loading players in which the inserted record is held at its center hole and is transferred to the turntable position. In such record players, in case where the spindle is not correctly set on the center hole, the spindle may contact against the record to cause a damage thereon and a break-down of the player mechanism.

In the prior art players, the record is transferred by an automatic loading mechanism, while the record disc is held at the center hole thereof. In such a condition, the record is unstable and there is a risk that the record may be slanted during the transportation, thereby causing damage of the record and break-down of the player.

Also, in the prior art players, it is necessary to ensure the projection of the holder which may clamp the record after the spindle is inserted into the spindle and prior to the movement thereof. If this timing is not attained, the holder may scratch the inner wall of the center hole to thereby cause a damage of the record and to drop the record during its transportation, disadvantageously.

SUMMARY OF THE INVENTION

The present invention provides as an object a novel automatic record loading player to overcome the above noted defects. The object is achieved by providing an automatic record loading player comprising a player cabinet having a front panel and a slit through which a record is inserted, the slit being formed in the front panel, drive means for transferring the inserted record to a centering position, centering means for centering the record while abutting against an outer periphery of the record, and loading means for transferring the centered record onto a turntable while maintaining the record at its center hole.

According to one aspect of the present invention, the centering means for automatic record loading players includes drive roller means for moving an inserted record to a centering position, guide levers rotating in the opposite direction to each other in abutment with a circumference of the record, a detecting lever rotating rearwardly in abutment with the circumference of the record, and a plurality of switches which are actuated by the rotations of the guide levers and the detecting lever, whereby by the switches, the drive roller is controlled so that records different in diameter may be centered at the constant centering position.

According to the present invention, record loading means for automatic record loading players includes a center spindle assembly for holding a centered record at its center hole, having at least three pairs of pins which are formed at different intervals on each side of the center spindle assembly, a pair of stationary guide plates each having therein a guide groove extending from a centering position to a turntable position, the guide groove being formed of a horizontal section, an inwardly extending section extending upwardly in association with an arrangement of the pins at the centering position and a downwardly extending section extending downwardly in association with the arrangement of the pins at the turntable position, and a drive guide having slant grooves for moving the center spindle assembly along the guide grooves of the guide plates, wherein the pins of the center spindle assembly are commonly engaged with the guide grooves of the guide plates and the slant grooves of the drive guide.

According to the present invention, an automatic record loading player comprises a center spindle assembly having a spindle movable up and down and detecting means for detecting a state that the spindle is correctly engaged with a center hole of a record.

According to another aspect of the present invention, an automatic record loading player comprises a center spindle assembly having a support plate and a spindle mounted on an underside of the support plate, the spindle having a retractable holder for holding a record at its center hole, and stationary cam means for lifting up the spindle in the transportation of the record to firmly clamp the record by the support plate and the retractable holder whereby the record is prevented from slanting in the transportation.

According to the invention, an automatic record loading player comprises holder means for holding a record at its center hole, fixed at a lower end of an eccentric shaft having at its upper end an L-shaped bent portion, the holder means being retractable into and projectable from a spindle, means for normally biasing the eccentric shaft to project the holder means from the spindle, fixed plate means for contacting against and rotating the eccentric shaft in the direction in which the holder means is retracted into the spindle when the spindle is not engaged with the center hole of the record, and stopping means for contacting against an rotating the eccentric shaft in the direction in which the holder means is retracted into the spindle, only when the record is unloaded from a turntable position.

DESCRIPTION OF THE PREFERRED EMBODIMENTS

The present invention will now be described with reference to the accompanying drawings.

Figure 1:
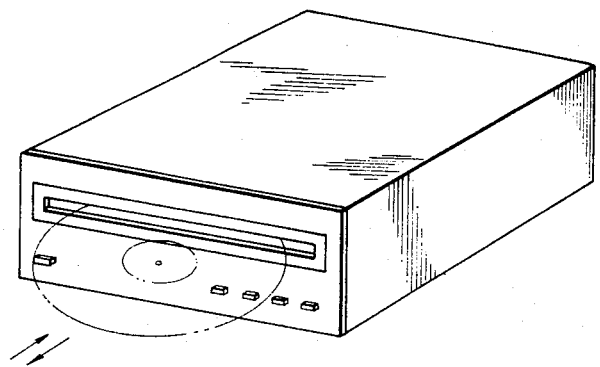
FIG. 1 is a perspective view of the first embodiment of record player according to the present invention.

FIG. 1 is a perspective view of the automatic record loading player in which in front of the player cabinet are provided a slit through which the record disc is inserted and various switches.

Figure 2:
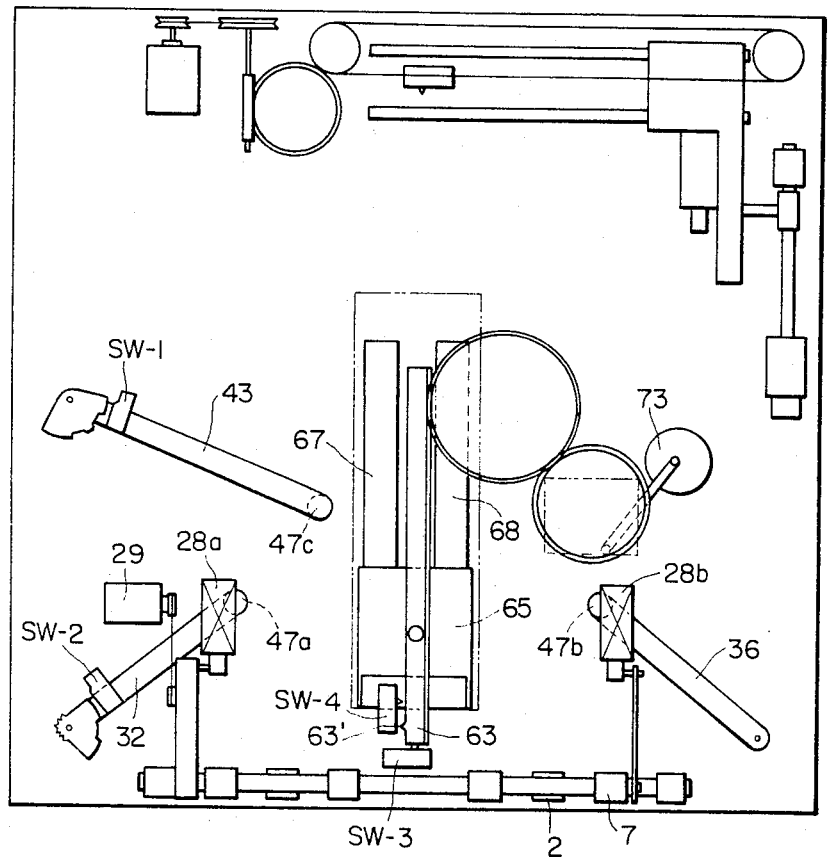
FIG. 2 is a schematic plan view of the inner mechanism of the record player.

FIG. 2 is a schematic plan view of its inner mechanism which comprises a centering mechanism for centering the inserted record disc through the slit, a loading mechanism for transferring the centered record disc, held at its center, to the turntable, and a play mechanism for achieved the automatic play.

(A) Centering Mechanism

Figures 3, 4, 5:
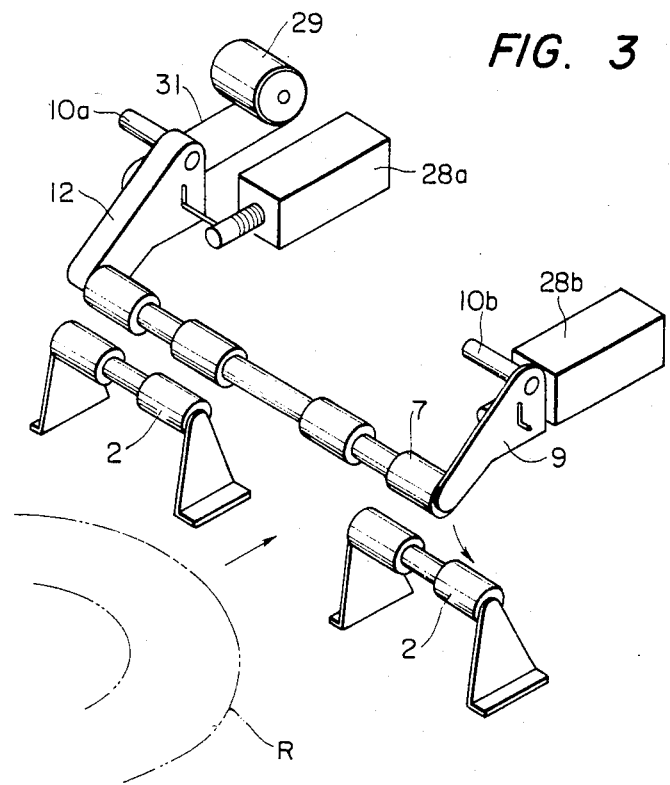
FIG. 3 is a perspective view of the drive roller and the driven rollers.
FIGS. 4 and 5 are a plan view and a side view showing, respectively, the left and right guide levers and the detecting lever.

As shown in FIG. 3, the centering mechanism is made up of a drive roller 7 and driven rollers 2 which are faced with each other just inside of and above and below the slit and a left guide lever 32, a right guide lever 36 and detecting lever 43 which support at ends three double truncated cone shaped rollers 47a, 47b and 47c, respectively, as best shown in FIGS. 4 and 5. The drive roller 7 is driven through a belt 31 and a gear box 12 by a motor 29, and is rotated around shafts 10a and 10b by means of plungers 28a and 28b so that it may be selectively in engagement with the driven roller 2. The two driven rollers 2 are mounted on the bottom plate of the player cabinet while the rollers 2 are faced with the drive roller 7 on the right and left sides. The right and left guide levers 36 and 32 are moved to rotate in the opposite directions to each other by the connecting rod or bar 49 and are biased to move close to each other by reset springs 57a at their specific shaped contact rollers 47a and 47b. On the left guide lever 32 is fixed a cam 40 for actuating a switch SW-2 mounted on an upper plate of the player cabinet. A gear portion 40a formed on the cam 40 is engaged with a projection 54a of a lock lever 54. Behind the left guide lever 32 are supported the lock lever 54 for locking the left guide lever 32 by the engagement with the gear portion 40a of the cam 40 and an L-shaped lever 50 which is rotated when the drive guide 65 is moved. The lever 54 and 50 are moved together by a connecting rod or bar 53.

The detecting lever 43 supporting at its end the contact roller 47c is biased in the clockwise direction, i.e., in the front direction with respect to the player cabinet by the reset spring 57b. A cam 46 for actuating a switch SW-1 mounted on the upper plate of the player cabinet is fixed to the detecting lever 43. The detecting lever 43 is coupled to an L-shaped lever 58 which is rotated in abutment with a cam 65a of the drive guide 65 by a bar 61, and in the play mode, the roller 47c is moved remote from the outer circumference of the record.

(B) Loading Mechanism

Figure 6:
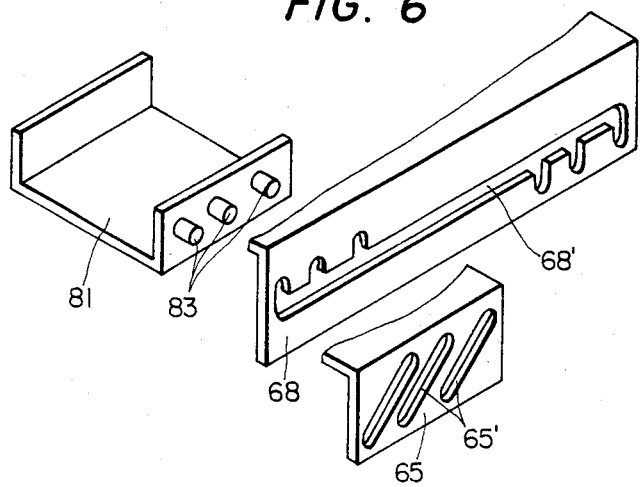
FIG. 6 is an exploded view showing the support means of the support plate.

Two stationary guide plates 67 and 68 are formed to extend from the centering position of the turntable along the upper plate of the player cabinet. The guide plates 67 and 68 are each in the form of an L-shaped in cross section. At the suspended portions, as shown in FIG. 6, grooves 67' and 68' (68' being shown therein since the two members have the same configuration) are formed. Three pairs of pins 83 formed on the support plate 81 supporting a center spindle assembly 80 are engaged with the grooves 67' and 68'. Further, the pins 83 are engaged with slant grooves 65' formed in the drive guide 65.

Figure 7A:
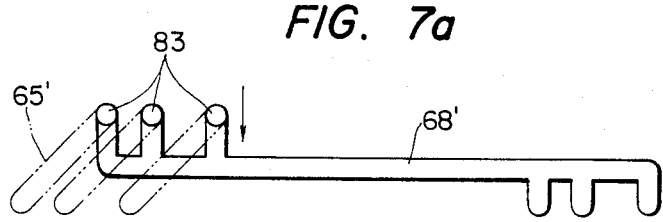
FIGS. 7a-e are an illustration showing the movement of the support plate in accordance with the movement of the drive guide.
Figure 7B:
Figure 7C:
Figure 7D:
Figure 7E:
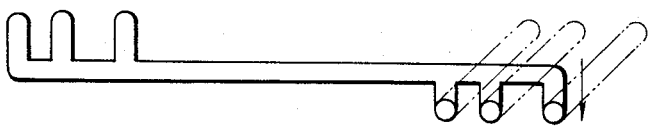

A rack 63 is fixed to the drive guide 65 and is movable back and forth by the rack drive motor 73. By the movement of the drive guide 65 from the centering position to the center of the turntable, the pins 83 of the support plate 81 are lowered at the centering position as shown in FIGS. 7a and b (at the left end in the figure), and subsequently, the pins are moved rearwardly and are further lowered at the turntable position as shown in FIG. 7e (at the right end in the figure). The three pairs of guide pins 83 are formed at different intervals. Even when the support plate 81 is close to the positions shown in FIGS. 7d and e, at least two pairs of guide pins are always disposed on the horizontal portions of the grooves 67' and 68'.

Figure 8A:
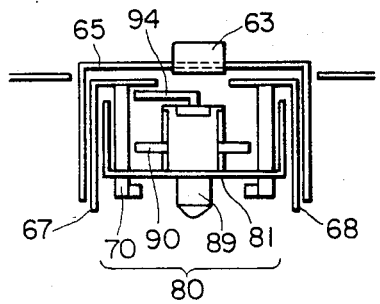
FIG. 8(a) is a front view of the center spindle assembly.

The center spindle assembly 80 supported on the support plate 81 is so constructed that as shown in FIG. 8a, the spindle 89 is supported movably up and down. At the lower outer periphery of the spindle 89, a holder 93 holding the record disc is retractable by an eccentric shaft 94. An upper portion of the eccentric shaft 94 is formed in an L-shape. In accordance with the movement of the drive guide 65, the eccentric shaft 94 is rotated in abutment with an angle plate 99 formed in the upper plate 108 of the player cabinet and the stopping member 96 supported to the angle plate 99 so that the holder 93 is projected from the spindle 89.

Figure 9C:
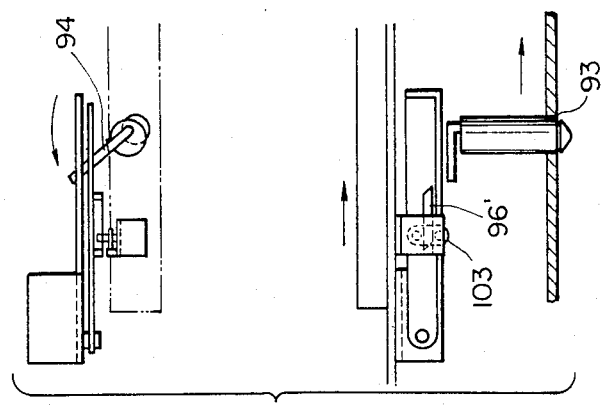
FIGS. 9a-c and 10a-c are illustrations showing the overall operations, respectively.
Figure 9B:
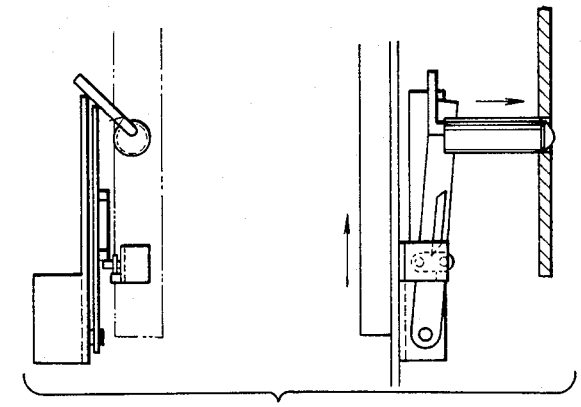
Figure 9A:
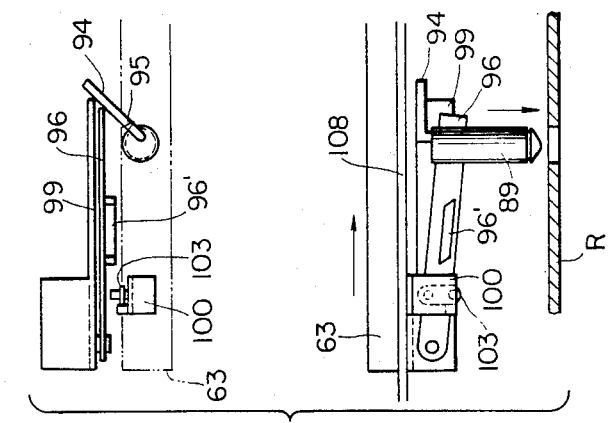
Figure 10C:
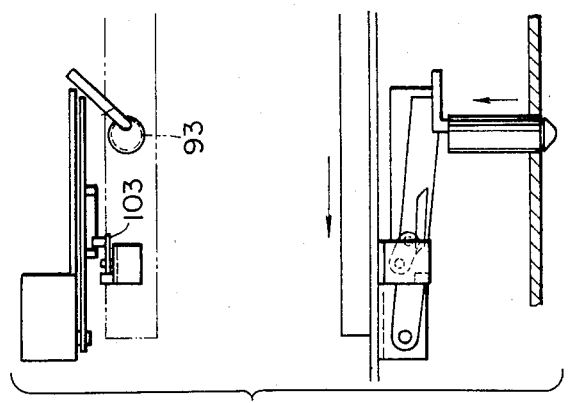
Figure 10B:
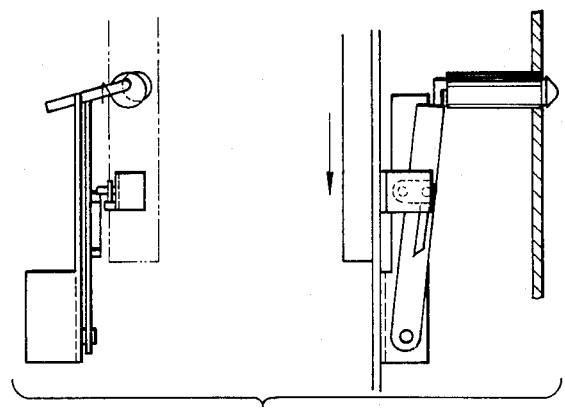
Figure 10A:
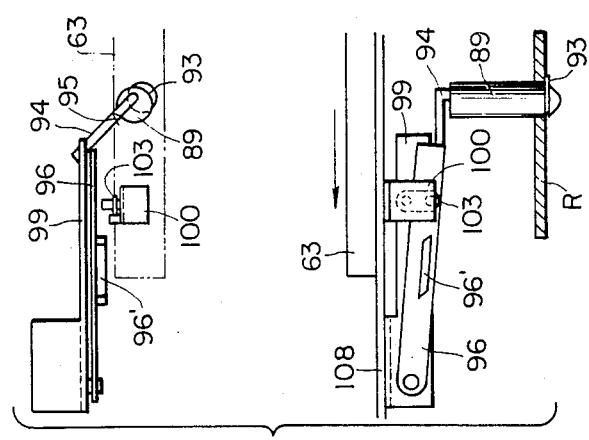
Figure 11A:
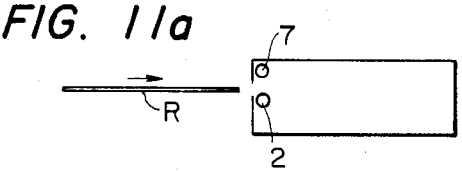
FIGS. 11a-f are an illustration showing the outline of the overall mechanism.

As shown in FIGS. 9 and 10, the stopping member 96 is changed in the angular position according to the difference in the movement direction of the drive guide 65. More specifically, when the drive guide 65 is moved from the centering position to the turntable, as shown in FIG. 9c, a side cam 96' of the stopping member 96 is engaged with a selector 103 supported at an angle 100 fixed to the rack 63. When the spindle 89 is lowered, the upper end of the eccentric shaft is moved to deviate from the stopping member 96 so that the eccentric shaft 94 is rotated in the counterclockwise direction under the force of the spring 95. As a result, the holder 93 projects to thereby hold the record.

Also, when the drive guide 65 is moved from the turntable position to the centering position, inversely, as shown in FIG. 10c, the selector 103 is rotated to pass through the side cam 96'. Since the stopping member 96 is maintained at the lowered position, and the stopping member 96 is not released from the eccentric shaft 94, the holder 93 is held in the retracted position, and subsequently when the spindle 89 is lifted upwardly, the record is released therefrom.

(C) Play Mechanism

The play mechanism is composed of the turntable mounted in the central portion of the player cabinet, a linear tracking arm mounted behind the turntable and a well known full automatic mechanism.

The operation will now be described.

Referring now to FIG. 11, an outline of the operation will be explained.

(i) A record disc R is manually inserted through the slit.

(ii) The drive roller 7 is a lowered to clamp and retract the record disc R.

(iii) The record disc R is stopped at the centering position, and the spindle 89 is lowered and the holder 93 is projected to thereby hold the record disc.

(iv) The drive roller is raised and the spindle is moved rearwardly.

(v) The record disc is stopped at the turntable position and is lowered onto the turntable.

(vi) The automatic play mode begins.

When the play is finished, the record disc is unloaded from the slit in the opposite order to the above.

(I) Centering

When the record disc is inserted through the slit, the outer periphery of the record is in abutment with the contact rollers 47a and 47b, and the left and right guide levers 32 and 36 are rotated in the left and right directions, respectively. Then, the disc is in abutment with the contact roller 47c of the detecting lever disposed rearwardly to thereby rotate the detecting lever 43 rearwardly.

When by the rotations of the guide lever 32 and the detecting lever 43, the switches SW-2 and/or SW-1 is turned on, the plungers 28a and 28b are actuated to thereby pressingly move the drive roller 7 against the record disc. At the same time, the motor 29 is actuated so that the record is retracted into the interior of the player cabinet.

Figure 12A:
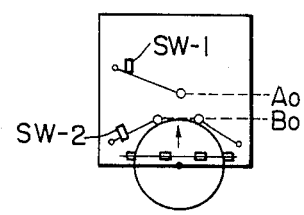
FIGS. 12a-c are an illustration showing the operation for the 17 cm record disc.
Figure 11B:
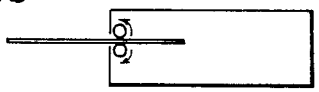
Figure 11C:
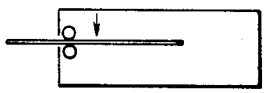
Figure 12B:
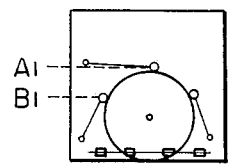
Figure 11D:
Figure 11E:
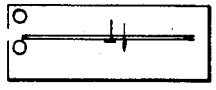
Figure 12C:
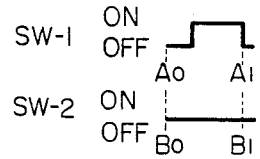
Figure 11F:
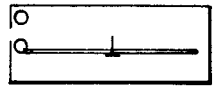
Figure 13A:
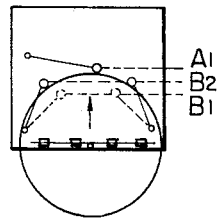
FIGS. 13a-c are an illustration showing the operation for the 30 cm record disc.
Figure 13B:
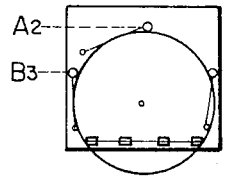

FIGS. 12 and 13 show the states in which the 17 cm and 30 cm diameter record discs are used, respectively. In case of the 17 cm record disc inserted, since the rotational movements of the right and left guide levers are small, as shown in FIG. 12c, the switch SW-2 is not changed from the off-state, the switch SW-1 is turned on by the operation of the detecting lever 43 to that the plungers and the drive roller are operative. Then, at the position A1 shown in FIG. 12b, the switch SW-2 is turned off and the drive roller is stopped.

Figure 13C:
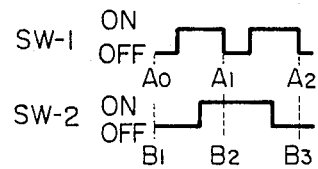

In case of the 30 cm record disc, as shown in FIG. 13c, the detecting lever 43 is rotated to the position A1, and even if the switch SW-1 is turned off, the switch SW-2 is turned on. Therefore, the drive roller is not stopped, and is stopped when the switches SW-1 and SW-2 are both turned off, at the position A2 shown in FIG. 13(b).

Incidentally, in any case, even if the drive roller is stopped at the centering position, the plungers are maintained in the biased position, and the drive roller is used to pressingly support the record.

(II) Loading

When the switches SW-1 and SW-2 are both turned off, the rack drive motor 73 is actuated so that the rack 63, that is, drive guide 65 commences to move rearwardly.

As described before, by the movement of the drive guide 65, the support plate 81 is lowered at the centering position along the grooves 67' and 68' of the guide plates, and the spindle 89 is engaged with the center hole of the record disc centered.

At the same time, as shown in FIG. 9c, the eccentric shaft 94 is moved to deviate from the angle plate 99 and is rotated in the counterclockwise direction, and the holder 93 is projected from the spindle 89 to thereby hold the record disc.

Also, the projecting portion 63' formed on the side surface of the rack 63 actuates the switch SW-4, so that the plungers 28a and 28b are deactivated and the drive roller 7 is raised to thereby release the record disc.

Furthermore, when the drive guide 65 is moved rearwardly, the support plate 81 is changed in its moving direction from the vertical direction to the horizontal direction along the grooves 67' and 68' of the guide plates 67 and 68 so that the drive guide 65 is moved rearwardly.

Figure 8B:
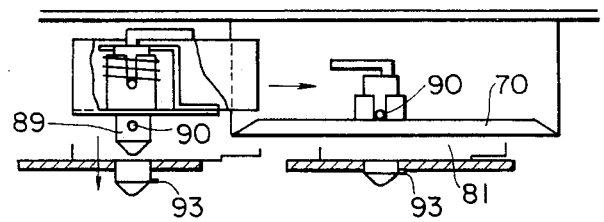
FIGS. 8(b) and (c) are illustrations showing the movement of the spindle.
Figure 8C:
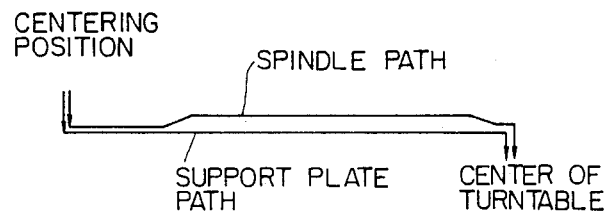
Figure 16:
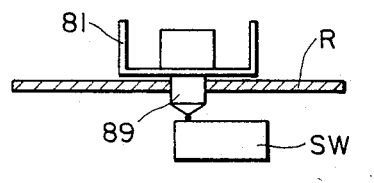
FIGS. 15a-c and 16 are views showing a safety device according to the present invention.

As shown in FIG. 8a, the spindle 89 is provided on its own sides with a pair of guide shafts 90. As shown in FIGS. 8b and c, the guide shafts ride over an up-and-down cam 70 and the spindle 89 is somewhat raised. By decreasing the interval between the holder 93 and the support plate 81, the record disc may be prevented from slanting during the transportation.

When the drive guide 65 is moved rearwardly, as indicated by the arrow in FIG. 4, the L-shaped lever 50 is rotated in the counterclockwise direction by the spring 57c so that the lock lever 54 is rotated while the projection 54a thereof is engaged with the gear portion 40a of the cam 40 to thereby lock the guide lever 32.

Figure 14A:
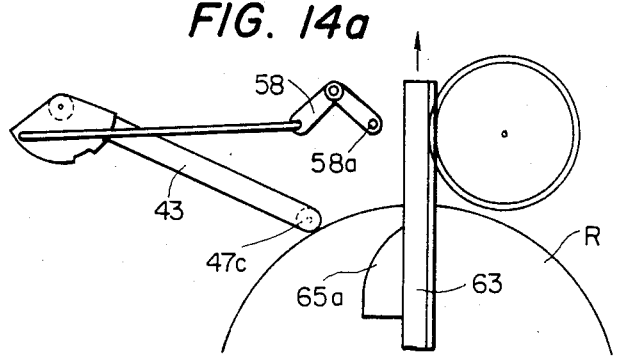
FIGS. 14a and b are an illustration showing the escape of the detecting lever.
Figure 14B:
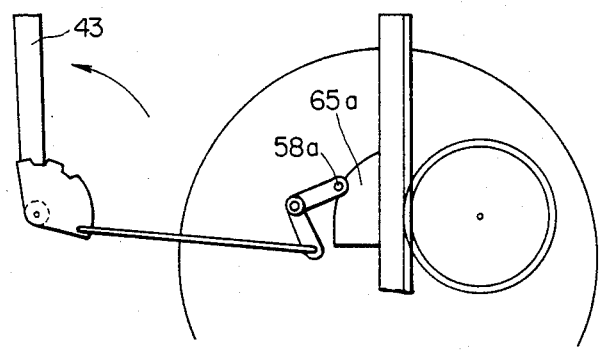

When the drive guide 65 is further moved rearwardly, as shown in FIG. 14, the L-shaped lever 58 is rotated in the clockwise direction by the cam 65a and the contact roller 47c deviates from the path of the record disc, the roller being formed on the detecting lever 43.

When the support plate 81 is brought to the turntable position, the moving direction is changed along the grooves of the guide plate and the plate is lowered and stopped at the turntable.

(III) Unloading

By the operations of the automatic play termination detecting and the eject switch, the rotation in the direction opposite to the loading in the rack drive motor 73 is commenced and the drive guide 65 is moved forwardly. In the opposite manner to the loading, the spindle 89 serves to lift the record disc from the turntable and then the disc is moved toward the centering position.

As different from the loading, as shown in FIG. 10, the selector 103 swung only rearwardly rides over the side surface cam 96' of the stopping member, and the stopping member 96 is projected downwardly from the angle plate 99. Therefore, the eccentric shaft 94 is in abutment with the stopping member 96 and is gradually rotated in the clockwise direction so that the holder 93 is retracted into the spindle 89.

When the rack 63 is positioned at the centering position, the switch SW-4 is actuated to bias the plunger, and the drive roller 7 is pressed against the record. Subsequently, The spindle is raised and the spindle is pulled apart from the center hole of the record.

When the rack 63 is moved at the frontmost position, a switch SW-3 is actuated so that the rack drive motor 73 is stopped and at the same time, the drive roller is rotated in the opposite direction. Then, the record is unloaded from the slit of the front panel of the cabinet so that the operations are terminated in the condition shown in FIG. 2.

Figure 15A:
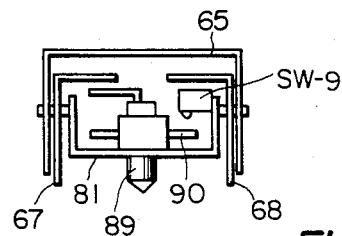

FIG. 15 shows another embodiment according to the present invention. There is a risk that in loading, the spindle 89 may not be engaged with the center hole of the record, this case, a safety device is additionally needed. The difference from the embodiment described above, is that the switch SW-9 is provided at the position where the guide shafts 90 of the spindle 89 are in abutment with the support plate 81 in the lift-up condition.

Figure 15B:
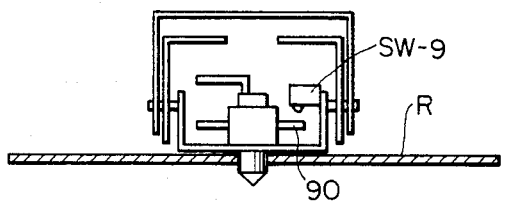

The operation will now be described. In case where the centering operation is normally achieved and the spindle 89 is engaged with the center hole, as shown in FIG. 15b, the switch SW-9 is not turned on.

Figure 15C:
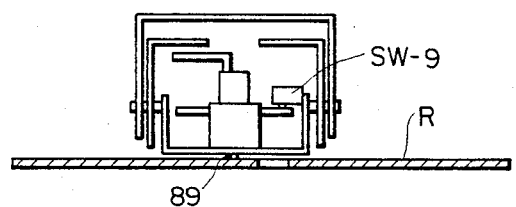

However, if due to some accidents, the centering operation of the record disc is not carried out, and as shown in FIG. 15c, the spindle 89 is not lowered in abutment with the record disc when the support plate 81 is lowered, the spindle 89 is raised with respect to the support plate so that the switch SW-9 is actuated by the guide shaft 90. When the switch SW-9 is actuated, the rack drive motor 73 is driven in the opposite direction, the drive guide 65 is moved forwardly, and the support plate 81 is raised so that the drive roller commences rotating in the opposite direction to the loading, to thereby unload the record disc.

Also, a switch may be provided on the lower side at the centering operational position of the record disc so that it may be positively detected that the spindle 89 is positioned in engagement with the center hole of the record disc.

Incidentally, in the above described embodiment, the record player in which the 17 cm and 30 cm records are commonly used has been explained. However, by selecting suitably the configuration and the number of the switches, of the guide lever and the cams fixed to the detecting lever, other record discs may of course be used.

As described above, in the automatic record loading player according to the present invention, the inserted record disc is transferred to the centering position by the drive mechanism, and after the centering operation, the record disc is transferred to the turntable position, so that even if the centering mechanism is provided in the record insertion position, the insertion of the record is facilitated and the centering mechanism and the loading portion can be miniaturized. Furthermore, the centering mechanism and the loading portion are separated from the play mechanism to thereby facilitate the maintenance and repair of the machine advantageously.

What is claimed is:

1. An automatic record loading player comprising centering means including:
    (a) drive roller means (7) for moving an inserted record in a given direction to a centering position;
    (b) guide levers (32, 36) having parallel rotational axes and movable to maintain abutment of both said levers with a circumference of the record;
    (c) connecting means (49) between said levers for causing said levers to rotate equally in opposite directions about their respective axes;
    (d) a detecting lever (43) rotating to give motion in said direction in abutment with the circumference of the record; and
    (e) a plurality of switches (SW-1, SW-2), which are actuated by the rotations of said guide levers and said detecting lever, whereby by said switches, said drive roller means is controlled so that records different in diameter may be centered at the constant centering position.

2. An automatic record loading player for loading between a centering position to a turntable position comprising record loading means including:
    (a) a center spindle assembly (80) for holding a centered record at its center hold, having a pair of sets of at least three co-linear pins (83) which have unequal spacings between the pins of a set, a set being disposed on each side of said center spindle assembly;
    (b) a pair of stationary guide plates (67, 68) each having therein a guide groove (67', 68') extending from the centering position to the turntable position, said guide groove being formed of a horizontal section extending from the centering position to the turntable position, an upwardly extending section extending upwardly at the centering position and a downwardly extending section extending downwardly at the turntable position, said upwardly and downwardly extending sections being formed to match the spacings of the pins of said center spindle assembly; and
    (c) a drive guide (65) having slant grooves (65') for moving said center spindle assembly along said guide grooves of said guide plates in response to force applied to said drive guide in a direction parallel to the horizontal section of said guide grooves wherein said pins of said center spindle assembly are commonly engaged with said guide grooves of said guide plates and said slant grooves of said drive guide.

3. An automatic record loading player for loading a record with a center hold between a centering position and a turntable position, comprising:
    (a) a lowerable and laterally movable spindle (89);
    (b) an eccentric shaft (94) fit axially into said spindle, said shaft having at its upper end an L-shaped bent portion;
    (c) holder means (93) for holding a record at its center hole, fixed at a lower end of said eccentric shaft (94), said holder means being retractable into and projectable from said spindle (89);
    (d) force exerting means (95) connected to said eccentric shaft for normally biasing said eccentric shaft to project said holder means from said spindle;
    (e) fixed plate means (99) for contacting against and rotating said eccentric shaft in the direction in which said holder means is retracted into said spindle when said spindle is not engaged with the center hole of the record;

(f) a selector (103) adjustable between a loading position and an unloading position; and (g) retractable stopping means (96) that is caused to retract by said selector being set in the loading position, whereby in the record loading from said centering position, when said bent portion having been engaged with said fixed plate is disengaged from said fixed plate upon a lowering of the spindle so that thereafter by the force of said force exerting means said holder means is projected from said spindle and in the record unloading from the turntable position with the selector set in the unloading position, said bent portion is in abutment with said stopping means so that on lateral movement of said spindle, said bent portion is rotated against said stopping means and said holder means is retracted into said spindle, thereby releasing the record at the centering position.

4. The player of claim 3, wherein said stopping means is rotatably mounted on said fixed plate, and only in the record loading, said stopping means is rotated at a position where said stopping means is not in abutment with said bent portion.

* * * * *